Patented Mar. 5, 1940

2,192,314

UNITED STATES PATENT OFFICE

2,192,314

MOISTUREPROOF MATERIAL

Emmette F. Izard and James A. Mitchell, Kenmore, N. Y., assignors, by mesne assignments, to E. I. du Pont de Nemours & Company, Wilmington, Del., a corporation of Delaware No Drawing. Application April 29, 1936, Serial No. 77,018

1 Claim. (Cl. 91—68)

This invention relates to a new composition of matter. More particularly, this invention relates to a new composition of matter comprising an N-alicyclic aryl sulfonamide, which composition has specific utility in the manufacture of plastic masses, coating compositions, pellicles, filaments or other cast, extruded or molded structures, particularly structures comprising a cellulose derivative.

It is well known in the plastic and coating art to use, in combination with a base material, a plasticizer or flexibilizing agent to impart resilience to plastic masses, suppleness to pellicles or filaments and flexibility to coatings. A large variety of plasticizers are available, depending on the type of base material and/or the type of composition or product desired. Among the plasticizers which have been proposed for use, especially in combination with cellulose derivative base materials, are certain sulfonamide derivatives, particularly certain N-alkylated derivatives of aryl or substituted aryl sulfonamides. Heretofore, the art has been concerned chiefly, however, with alkyl derivatives such as mono- or di-N-methyl, or N-ethyl derivatives of benzene, toluene or xylene sulfonamides. These derivatives have served a useful purpose as plasticizing agents, especially for compositions comprising cellulose acetate, but most of them are lacking in many properties which are now desirable in the advanced state of the plastic, coating and pellicle arts.

It has now been found that N-alicyclic derivatives of aryl sulfonamides can be produced and that such derivatives are particularly useful as plasticizing agents for cellulose derivative base materials since they impart thereto improved softness and greater thermoplasticity without permanent tackiness. These properties and others which will be set forth hereinafter render the N-alicyclic aryl sulfonamides of particular advantage in the manufacture of plastic masses, pellicles, filaments, coating compositions and the like.

It is therefore, an object of this invention to produce, as a new composition of matter, an N-substituted aryl sulfonamide in which at least one hydrogen atom of the amido group is replaced by an alicyclic group.

It is another object of this invention to produce an N-substituted aryl sulfonamide in which at least one hydrogen atom of the amido group is replaced by an alicyclic group, which sulfonamide is suitable for use as a plasticizer in the manufacture of cast, extruded or molded structures.

It is a further object of this invention to produce a new composition of matter comprising a cellulose derivative plasticized with an N-alicyclic aryl sulfonamide.

It is a still further object of this invention to produce a new composition of matter comprising a cellulose derivative plasticized with an N-alicyclic aryl sulfonamide which is suitable for use as a moistureproofing coating composition for sheets and films of transparent regenerated cellulose.

Other objects of the invention will become apparent by reference to the following detailed description.

The objects of the invention may be accomplished generally by reacting an aryl sulfonamide or a nuclear-substituted aryl sulfonamide with a suitable alicyclic halide or by reacting an aryl or a nuclear-substituted aryl sulfonyl halide with a mono- or di-alicyclic amine, the reaction in either case being carried out in the presence of an alkali. The products of the reaction after being isolated may be formulated into a plasticized composition by incorporating 5% to 60% and preferably 10% to 35% thereof in a composition, for example, a cellulose derivative composition.

In the production of the N-alicyclic aryl sulfonamides by any of the above mentioned reactions the degree of substitution of the alicyclic groups in the aryl sulfonamides can be controlled by the choice of method of preparation or by the relative proportions of the reactants. The reaction products may be isolated and purified in a manner well known to the art, and subsequently incorporated in the desired composition.

For the preparation of the N-alicyclic aryl sulfonamides of the present invention, any alicyclic primary or secondary amine, or any alicyclic halide may be used. Similarly, any alicyclic chloride, bromide or iodide may be employed. It is to be understood, that by the term "alicyclic", is meant any non-aromatic carbocyclic group such as cyclobutyl, cyclohexyl, methylcyclohexyl, or decahydronaphthyl, as well as alicyclic groups in which there may be substituent aryl groups, such as, phenylcyclophexyl. In cases of alicyclic groups containing aromatic substituents, it is to be understood that the amino nitrogen or the halogen will be attached to alicyclic carbon atoms only.

The sulfonic acid residue in the sulfonamide may be derived from an aryl or nuclear-substituted aryl sulfonamide or sufonyl halide, such as, for example, the sulfonamides or sufonyl chlorides of benzene, toluene, xylene, ethyl benzene, chloro-benzene, dichlorobenzene, tetrahydronaphthalene, and naphthalene. Obviously, the sulfonamides will be used to react with the alicyclic halides while the sulfonyl halides, particularly the chlorides, will be used if reaction is intended with alicyclic amines.

Thus, it will be seen that the N-alicyclic aryl sulfonamides contemplated by the invention embrace such compounds as may be represented by the type formula,

in which $R_1$ designates benzene, its homologues, naphthalene, or the hydrogen, halogen, alkyl, alkoxy, aryl or hydrocarbon substitution products thereof, in which $R_2$ designates hydrogen, alkyl, aryl or a monovalent alicyclic group, and in which $R_3$ designates a monovalent alicyclic group such as cyclohexyl, methylcyclohexyl, ethylcyclohexyl, decahydronaphthyl, phenylcyclohexyl, cyclobutyl, cycloheptyl, cyclopentyl, or an unsaturated alicyclic group such as cyclohexenyl. When $R_2$ and $R_3$ are both monovalent alicyclic groups they may be the same or different alicyclic groups.

The following detailed examples will illustrate the methods for the production of N-alicyclic aryl sulfonamides, however, the invention is not to be limited thereto.

EXAMPLE I.—*Preparation of N-cyclohexyl para-toluene sulfonamide*

A solution of 200 g. of para-toluene sulfonyl chloride in 300 g. of benzene was decolorized with carbon and filtered. The solution was added to 100 g. of cyclohexylamine, 42 g. of sodium hydroxide in 200 g. of water being added simultaneously. The mixture was heated with stirring on a steam bath at 90–100° C., for 1 hour. Upon cooling, the reaction mixture separated into two layers. The non-aqueous layer, containing the N-cyclohexyl para-toluene sulfonamide, was separated, the benzene was distilled off, and the residue was crystallized from alcohol. The purified N-cyclohexyl para-toluene sulfonamide thus obtained melts at 81–82° C. and is very compatible with cellulose derivatives.

EXAMPLE II.—*Preparation of N-dicyclohexyl para-toluene sulfonamide*

A solution of 400 g. of para-toluene sulfonyl chloride in 600 g. of benzene (decolorized with carbon and filtered) and a solution of 80 g. of sodium hydroxide in 200 g. of water were slowly added separately but simultaneously to a solution of 380 g. of dicyclohexylamine in 400 g. of water. During this operation the mixture was stirred constantly. The reaction occurred without external heating. After all of the reactants had been added and the solution had been stirred for about 15 minutes, the non-aqueous layer was separated, washed with water, and dried. The solution was then heated at about 130° C. under approximately 30 mm. pressure to remove volatile matter. When the benzene and other volatile ingredients of the reaction mixture had been distilled off, the residue was treated with decolorizing carbon and filtered hot. The N-dicyclohexyl para-toluene sulfonamide which is thus obtained is a colorless liquid.

Other aryl sulfonyl halides and other alicyclic amines may be substituted for the para-toluene sulfonyl chloride and the cyclohexylamines disclosed in the examples given above. As previously mentioned, the same N-alicyclic aryl sulfonamides may also be prepared by reacting the appropriate aryl sulfonamides with the desired alicyclic halides.

The following formulations are given as illustrative, non-limitative examples to show the utility of these N-alicyclic aryl sulfonamides in a variety of compositions. In these examples the term "solvent" designates suitable solvent mixtures, as of esters, alcohols, and hydrocarbons, which will be obvious to one skilled in the art.

EXAMPLE III

| | Parts by weight |
|---|---|
| Cellulose acetate (52% acetyl) | 100 |
| N-cyclohexyl para-toluene sulfonamide | 85 |
| Acetone | 450 |

This composition is suitable for casting films which are useful as inner layers for safety glass or as substitutes for transparent regenerated cellulose wrapping tissues. It is also useful for coating rigid surfaces such as wood, metals, etc.

EXAMPLE IV

| | Parts by weight |
|---|---|
| Cellulose acetate (56% acetyl) | 100 |
| N-dicyclohexyl para-toluene sulfonamide | 34 |

When these materials are intimately mixed and properly comminuted by methods which are well known to those skilled in the art, the resulting composition is useful as a plastic for molding, extrusion, etc.

EXAMPLE V

| | Parts by weight |
|---|---|
| Ethyl cellulose | 100 |
| N-cyclohexyl para-toluene sulfonamide | 20 |

This composition is useful as a plastic for molding powders, for extrusion, and for the preparation of transparent sheets.

EXAMPLE VI

| | Parts by weight |
|---|---|
| Cellulose nitrate | 26.9 |
| Dewaxed gum dammar | 6.6 |
| Wax | 1.9 |
| Cyclohexyl p-toluene sulfonamide | 14.1 |
| Solvent | 353.5 |

EXAMPLE VII

| | Parts by weight |
|---|---|
| Cellulose nitrate | 26.9 |
| Dewaxed gum dammar | 6.6 |
| Wax | 1.9 |
| Dicyclohexy p-toluene sulfonamide | 14.1 |
| Solvent | 353.5 |

Compositions such as those indicated in Examples 6–7, inclusive, are useful in moisture-proofing various base structures, particularly cellulosic pellicles such as those composed of regenerated cellulose, glycol cellulose, cellulose glycollic acid or the like, as in the manufacture of transparent, flexible wrapping tissues which are substantially non-fibrous, yet are moisture-proof and satisfactorily heat-sealable.

EXAMPLE VIII

| | Parts by weight |
|---|---|
| Cellulose nitrate | 12 |
| Gum dammar | 3 |
| N-Decahydronaphthyl p-toluene sulfonamide | 4 |
| Castor oil | 2.6 |
| Solvent | 166 |

EXAMPLE IX

| | Parts by weight |
|---|---|
| Cellulose nitrate | 12 |
| Pigment | 16 |
| Resins | 3.5 |
| Oil | 3.5 |
| Dicyclohexyl xylene sulfonamide | 4 |
| Solvent | 181 |

The compositions set forth in Examples 8 and 9 are suitable for use in coating metal, wood, or the like.

In the foregoing examples of coating and plastic compositions, it wil be understood that other cellulose derivatives including cellulose propionate, cellulose butyrate, cellulose acetate-butyrate, benzyl cellulose, dodecyl cellulose, butyl cellulose, and the like may be substituted for all or part of the cellulose derivatives specified.

Similarly, other natural resins such as kauri, sandarac, shellac, etc., other synthetic resins such as polymerized vinyl acetate, phenol-aldehyde resins, polybasic acid-polyhydric alcohol condensation products (alkyd resins), poly-ether resins obtained by condensation of polyhydric phenols with alkyl polyhalides or various other natural or synthetic resins may be employed in combination with the above described N-alicyclic aryl sulfonamides.

As the plasticizer for any of the compositions described herein, any of the N-alicyclic, aryl sulfonamides may be used alone or in combination with other compounds of the same type, or with other previously known plasticizers such as triacetin, camphor, dibutyl phthalate, tricresyl phosphate, di-methoxyethyl phthalate, or the like.

To any of the compositions which may be prepared according to this invention may be added pigments, fillers, dyes, solvents, oils, waxes, etc., as needed and desired.

The compositions of matter prepared in accordance with this invention comprising cellulose derivative base materials plasticized by means of N-alicyclic aryl sulfonamides are useful as coating compositions for metals, wood, paper, fabrics, wire screen, and various cellulosic structures and pellicles. Such plasticized cellulose derivative base materials may be used as plastic compositions in the manufacture of filaments, pellicles, sheets, tubes, rods, safety glass interlayers, dentures, and the like.

As previously stated, the N-alicyclic sulfonamides of the type described herein are superior to most of the alkyl-substituted sulfonamides heretofore suggested as plasticizing agents because, inter alia, of their improved water and moisture resistance and their ability to impart these properties to compositions containing them. These characteristics make them particularly useful in the preparation of moistureproofing compositions where it is desired to provide a coating which will be substantially impervious to the transmission of water vapor. Thus, compositions of the character set forth in Church et al. U. S. 1,737,187 may be prepared to advantage with N-alicyclic sulfonamides.

The ability of these plasticizing agents to impart improved thermoplasticity to compositions containing them makes them particularly useful in the preparation of coating compositions which are capable of self-sealing on the application of heat. Thus, if a moistureproofing coating composition which will be heat-sealable is desired, the plasticizers of the type described will be of especial value.

Moistureproofing coating compositions generally comprise a film-forming base material such as a cellulose derivative or a resinous material and a moistureproofing agent such as a wax, with or without added plasticizer and/or resin. It has been found that the plasticizer may play an important role in the production of a highly moistureproof coating not only as a flexibilizing and plasticizing agent but in augmenting the moistureproofness. The plasticizers described herein are particularly valuable because they serve not only as flexibilizing agents but materially augment or enhance the moistureproofing properties of the moistureproofing agents.

The N-alicyclic aryl sulfonamides described herein are also useful as plasticizers, softeners, or modifying agents for various natural and synthetic resins. They are, for example, useful in admixture with acrylic resins such as methyl methacrylate, and with vinyl acetate, vinyl chloroacetate, polybasic acid-polyhydric alcohol resins, etc.

The N-alicyclic aryl sulfonamides constitute highly useful compounds which are high-boiling, water-resistant, substantially non-volatile in nature. They may be used to great advantage in the preparation of plasticized compositions containing cellulose derivatives and/or natural or synthetic resins, or the like. These compounds are characterized by a greater water resistance than similar compounds known to the art and have been found to give definitely superior products when used in comparison with most of the compounds known heretofore.

Since it is obvious that various changes and modifications may be made in the processes and products above described without departing from the nature and spirit of the invention, it is to be understood that the invention is not to be limited thereto except as set forth in the appended claim.

We claim:

A transparent moistureproof heat-sealable wrapping tissue consisting of a transparent regenerated cellulose base sheet having a moistureproofing surface coating, said moistureproofing coating consisting of:

| | Parts by weight |
|---|---|
| Film forming material | 26.9 |
| Wax | 1.9 |
| Dewaxed gum dammar | 6.6 |
| Plasticizing material | 14.1 | the plasticizing material being from the group consisting of N-cyclohexyl-p-toluene sulfonamide and N-di-cyclohexyl-p-toluene sulfonamide, and the film forming material being from the group consisting of cellulose nitrate and cellulose acetate.

EMMETTE F. IZARD.
JAMES A. MITCHELL.